Nov. 29, 1966 H. C. STRICKER, JR., ET AL 3,288,492

TRAILER CHASSIS AND CONNECTING MEANS THEREFOR

Filed Aug. 10, 1964 5 Sheets-Sheet 1

INVENTORS
H. C. STRICKER, JR.
J. T. CRIBBEN
G. A. SILL

BY Robb & Robb
Attorneys

Nov. 29, 1966 H. C. STRICKER, JR., ET AL 3,288,492

TRAILER CHASSIS AND CONNECTING MEANS THEREFOR

Filed Aug. 10, 1964 5 Sheets-Sheet 2

INVENTORS
H. C. STRICKER JR.
J. T. CRIBBEN
G. A. SILL

BY Robb & Robb
attorneys

Nov. 29, 1966 H. C. STRICKER, JR., ET AL 3,288,492
TRAILER CHASSIS AND CONNECTING MEANS THEREFOR
Filed Aug. 10, 1964 5 Sheets-Sheet 3

INVENTORS
H. C. STRICKER JR.
J. T. CRIBBEN
BY G. A. SILL
Robb & Robb
attorneys

TRAILER CHASSIS AND CONNECTING MEANS THEREFOR

INVENTORS
H. C. STRICKER JR.
J. T. CRIBBEN
BY G. A. SILL
Robb & Robb
attorneys

Nov. 29, 1966 H. C. STRICKER, JR., ET AL 3,288,492

TRAILER CHASSIS AND CONNECTING MEANS THEREFOR

Filed Aug. 10, 1964 5 Sheets-Sheet 5

INVENTORS
H.C. STRICKER JR.
J.T. CRIBBEN
BY G.A. SILL
Robb & Robb
attorneys

United States Patent Office 3,288,492

Patented Nov. 29, 1966

3,288,492
TRAILER CHASSIS AND CONNECTING MEANS THEREFOR

Henry C. Stricker, Jr., and Gerald A. Sill, Edgerton, and James T. Cribben, Janesville, Wis., assignors to Highway Trailer Industries, Inc., Edgerton, Wis., a corporation of Delaware Filed Aug. 10, 1964, Ser. No. 388,651
10 Claims. (Cl. 280—415)

This invention relates to chassis and connecting means therefor and primarily to novel construction of chassis units which facilitate the connecting of a pair of substantially identical units together so as to form an integral unit itself capable of supporting loads thereon, and in turn making possible subsequent separation of such units whereby the same may be used as individual chassis or carrying vehicles thereafter.

In the art to which this invention is directed, namely that of freight hauling trailers, for over the highway operation, it is economically desirable to arrange to connect and disconnect relatively small units together for simultaneous operation by a single tractor unit, and subsequent separation of such units from their integrated condition into separate units again for operation by separate tractor units or the like.

With the foregoing in mind, the art has heretofore provided certain means to connect trailer units together as such relying upon the containers which provide the storage and freight carrying capacity therewithin, as structural parts necessary to support the chassis connected thereto and in turn connected to each other so that the simultaneous operation of a single unit is feasible.

One of the problems raised by the foregoing arrangement is the fact that it is impossible to leave one of the containers which can be removed from the chassis at one location and a container of similar nature at another location because of the necessity to depend upon the structural arrangement of the containers and their coaction to support the combined container as a single unit for transport thereof.

In view of this situation, the instant invention has been evolved, to provide facilities which will make possible the support of loads on chassis units independently of the container or similar instrumentality carried thereby, this necessitating of course that the chassis as such be constructed so that they are sufficiently strong and adequately arranged to support the types of loads possible and obviate the necessity to depend upon any superstructure which is itself connected to the chassis unit for the desired support during operation in transport.

It is therefore a particular object of this invention to provide chassis construction which will facilitate the connecting together of chassis, a pair or more as the case may be, which themselves will support loads irrespective of the location of such loads upon the chassis and independently of any superstructure which would be provided by a container or the like and connected to the chassis and in turn connected to each other.

A further object of the invention is to provide novel chassis construction in which truss means are provided, facilitating the use of any of the units as a forward or aft unit and thus making them interchangeable, with connection of the various elements in a sufficiently arranged structural relationship to provide the desired support.

An even more specific object of the invention is to provide novel chassis construction which facilitates the positioning of supporting bogies thereon in the respective units, and movement of the bogies to their desired position as the units are manipulated, at the same time making possible the support of loads carried by the chassis because of the connection and inter-relationship of the structural elements of the chassis as provided in a manner to make possible separating and connecting of the same at will.

Other and further objects of the invention will be understood from a consideration of the specification appended hereto and disclosed in the drawings wherein.

Figure 1:
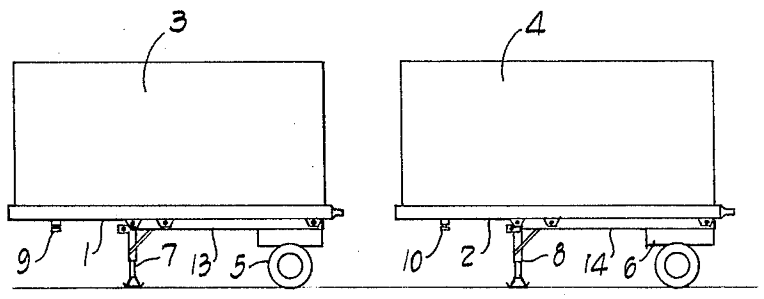
FIGURES 1, 2 and 3 are largely diagrammatic illustrating the manner of operation of chassis units constructed in accordance with this invention so as to carry out the integrated operation thereof or separate operation as the case may be.
Figure 2:
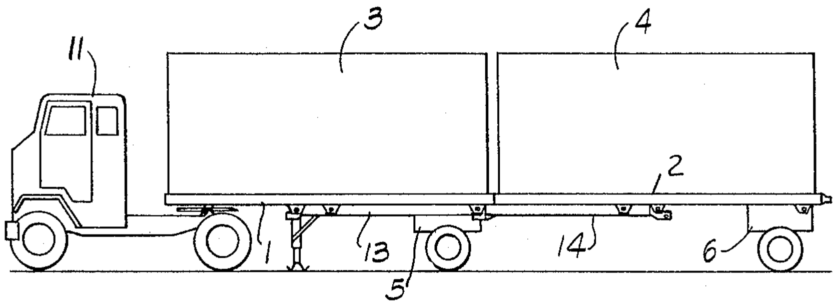
Figure 3:
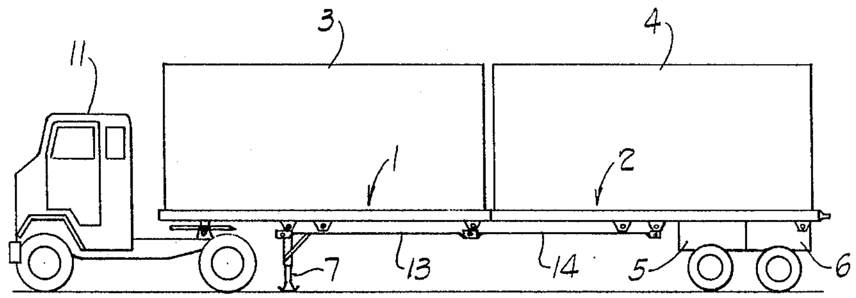

Referring initially to FIGURES 1, 2 and 3, the chassis units of this invention are shown in the various positions which they occupy whether as separate trailer parts or combined as an integral supporting unit, the forward chassis being designated generally at 1, the aft chassis at 2 with containers 3 and 4 respectively supported on the chassis and fastened in any suitable manner thereto as to be subsequently set forth.

The forward chassis 1 is provided with a bogie 5, the aft chassis having a bogie 6, these bogies being slidable along the chassis in a manner likewise to be further explained and set forth hereinafter.

Suitable landing gear 7 and 8 respectively are provided with king pins 9 and 10 carried in the usual manner by the said chassis so as to provide for connection to a tractor unit such as 11, this being a unit of common form and thus not further described in detail.

In FIGURE 1 the chassis and containers supported thereby are shown as being separated and supported on their own individual bogies and landing gear as though preparatory to connecting the same up along the lines illustrated in FIGURE 2.

In FIGURE 2 the forward chassis 1 and container 3 supported thereby is shown as having been moved rearwardly toward the chassis unit 2 and container 4 carried thereby by the tractor unit and a coupling of the chassis has been effected in conjunction with the truss members 13 and 14 being provided in identical pairs at opposite sides of the chassis and connected at their adjacent ends in a manner to be further set forth.

The FIGURE 3 disclosure illustrates the unit as completely coupled with the bogie 5 moved rearwardly into a position adjacent the bogie 6, and the tractor 11 in position to tow the combined unit in highway operation for example.

Figure 4:
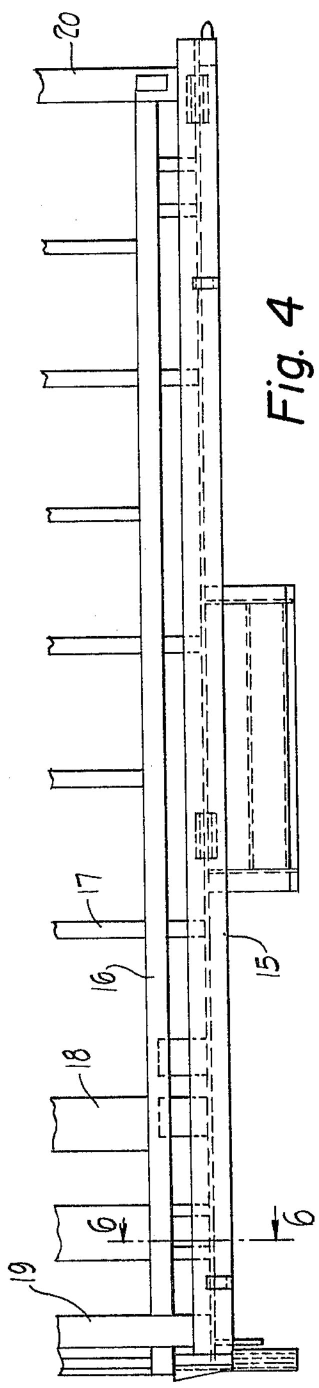
FIGURE 4 is a plan view, fragmentary in nature of one-half of a portion of an individual chassis and illustrates certain of the structural elements thereof.
Figures 5, 6, 8:
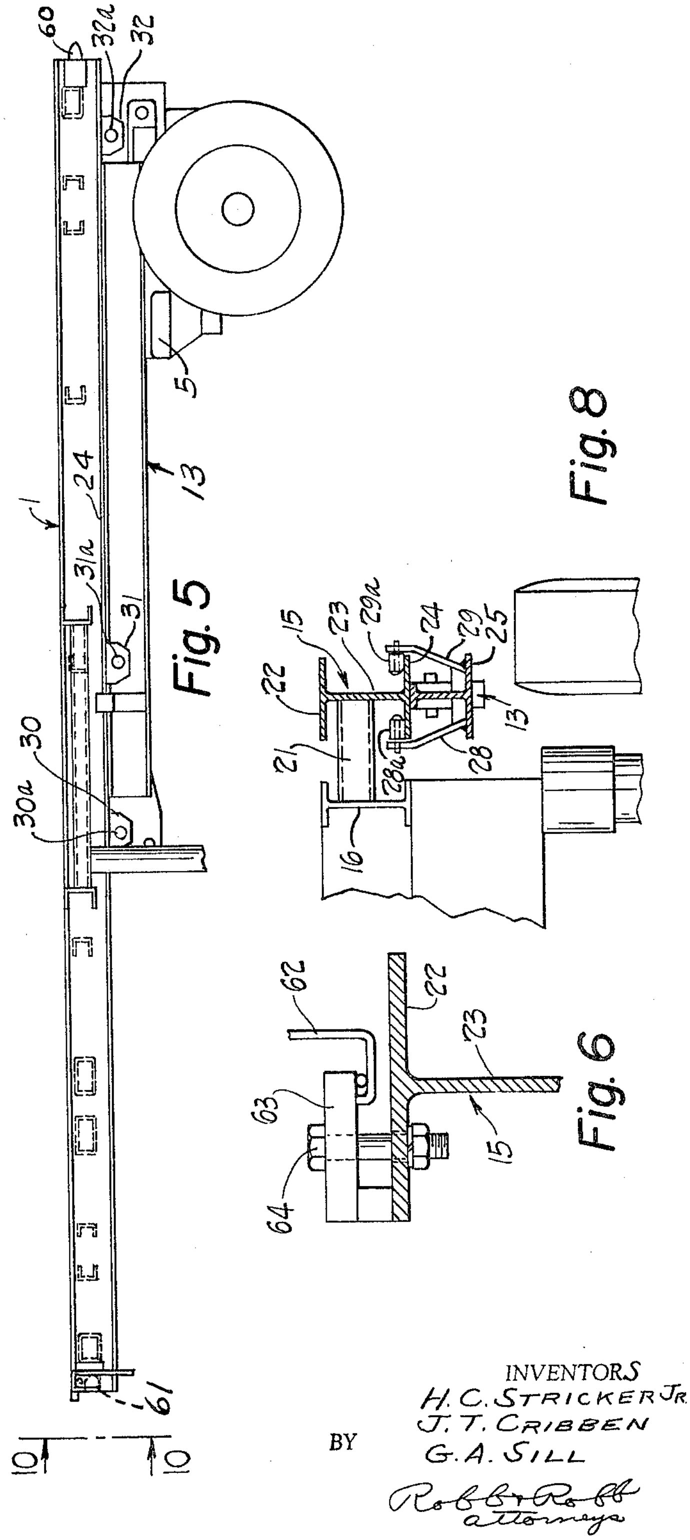
FIGURE 5 is a side view illustrating the position of a bogie for example, and certain of the connecting means on the frame unit for purposes to be subsequently described.
FIGURE 6 is an enlarged fragmentary sectional view taken about on the line 6—6 of FIGURE 4 looking in the direction of the arrows as though a container were supported on the chassis unit and the hold down elements thereof interengaged with appropriate connections on the frame unit itself.
FIGURE 8 is an enlarged fragmentary view taken about on the line 8—8 of FIGURE 7 looking in the direction of the arrows, to further illustrate the relationship of the structural elements.

The details of the chassis units and truss members provided thereon are set forth in conjunction with subsequent figures and particular attention is initially drawn to FIGURES 4 and 5 wherein the chassis 1 for example is shown in somewhat greater detail than the previous figures, the chassis unit 2 being identical therewith.

The chassis unit 1 includes a pair of longitudinal frame members 15, parallel and spaced from one another, these in turn being connected to frame elements 16 likewise provided in pairs and spaced apart, the frame elements being in turn fastened together by bolsters such as 17 and 18 with forward bolster 19 and rear bolster 20 extending transversely and at their ends supporting the longitudinal frame parts 15, these parts 15 comprising I-beams about as illustrated in FIGURE 8 for example.

The frame elements 16 are similar I-beams of somewhat lighter construction, the bolster parts such as illustrated in FIGURE 8 and denoted 21 being availed of to connect the elements 16 with the elements 15.

As will be noted the elements 15 are provided with a wide flange 22 at the upper edge of the web 23, a lower flange 24 of about the same width as the flange 22 being provided.

The longitudinal frame parts 15 which comprise I-beams as previously pointed out, are in turn arranged so as to support therebeneath the truss members 13, these being provided in pairs at opposite sides of the frame unit 1, however in this instance the truss member 13 such as illustrated in FIGURES 13 to 16 inclusive in detail, includes a lower flange 25 of substantial width, in fact width about equal to the flanges 22 and 24, with a web 26 extending upwardly therefrom and at its upper edge having a narrow flange 27 extending therealong.

Each truss member 13 is arranged with suitable means 28 and 29 as indicated in FIGURE 8 and extending upwardly therefrom, to support the truss member 13 on suitable rollers such as 28*a* and 29*a*. The rollers 28*a* and 29*a* of course extend inwardly and engage with the upper face of the lower flange 25, the members 28 and 29 being affixed as by welding or the like to the flange 25 at their lower ends.

Figure 13:
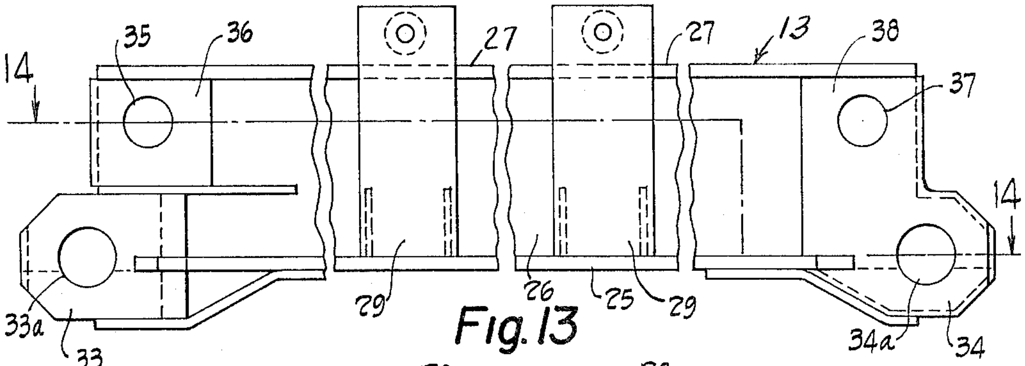
FIGURE 13 is a side view of one of the truss members, foreshortened so as to illustrate the various connecting phases and supporting phases thereof.
Figure 14:
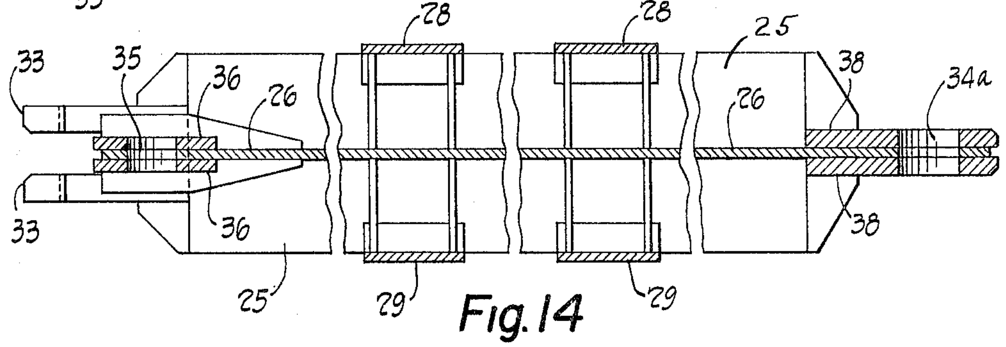
FIGURE 14 is a sectional view taken about on the line 14—14 of FIGURE 13 looking in the direction of the arrows.

As indicated in FIGURE 13, pairs of these supports 28 and 29 are provided, so that the truss member 13 for example is easily moved fore and aft on the longitudinal frame part 15 of the chassis unit 1, or the chassis unit 2 depending upon the position of the respective chassis with respect to one another, all in a manner to be understood as this description proceeds.

Extending downwardly from the lower flange 24 of the frame part 15, are pairs of lugs 30, 31 and 32, these lugs being suitably fastened to the flange 24 and including openings 30*a*, 31*a* and 32*a* therein as indicated in FIGURE 5.

The truss members 13 and 14, being identical, are shown in greater detail in FIGURES 13 to 16 inclusive, as previously indicated, these members including at their forward ends the spaced apart ears 33 having the openings 33*a* therein, in alignment transversely, with an ear 34 at the rear end of the truss members 13 and 14, an opening 34*a* being provided therethrough. It is noted that these ears 33 and 34 extend below the flange 25. A suitable opening 35 is provided in a thickened section 36 in the web 26, for purposes to be subsequently explained, this opening 35 being at the forward end of each truss member.

An opening 37 is provided at the rear of each truss member in a reinforced section 38.

Although the lugs on the aft frame unit 2 are identical with the lugs of the forward frame unit 1, for the sake of this description they will be designated 40, 41 and 42, with the openings designated 40*a*, 40*b* and 40*c*, respectively.

Similarly the truss member 14 although identical with the truss member 13 for example and these of course being provided in pairs, the ears at opposite ends of the truss member 14 will be differently designated 43 and 44 with openings 43*a* and 44*a* respectively.

Whereas the truss members 13 and 14 act as tension members when connected in the manner to be subequently set forth during operation of the frame units 1 and 2 as an integral unit, the compression members are constituted by the longitudinal frame parts 15, the corresponding frame parts of the second or aft frame unit 2 being designated 15*a* for the sake of this description.

Intermediate the ends of the parts 15 and 15*a*, a suitable adjusting means to adjust the compression position of the respective parts is provided, this being further illustrated in detail in FIGURES 9 to 12 inclusive.

Figure 9:
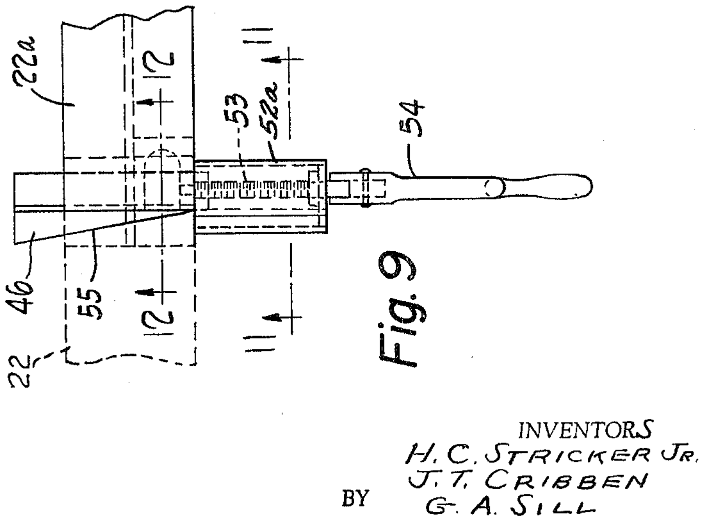
FIGURE 9 is a fragmentary plan view of certain adjustable compression means.

This compression adjustment means is arranged so that it coacts between the upper flanges of the respective frame parts, the flanges being designated 22 and 22*a*, the flange 22*a* being illustrated in an enlarged position in FIGURE 9 for example.

Figure 12:
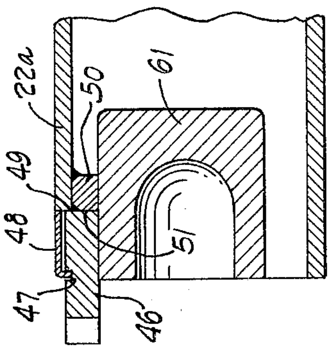
FIGURE 12 is an enlarged fragmentary view taken about on the line 12—12 of FIGURE 9 looking in the direction of the arrows.

Arranged transversely of the end of the flange 22*a*, is a wedge number 46, shown in enlarged cross sectional detail in FIGURE 12, having the groove 47 extending therealong, with a keeper guide 48 connected to the end 49 of the flange 22*a*, the flange end being reinforced by a member 50 suitably fastened to the flange 22*a* and providing a bearing surface against which the edge 51 of the wedge member 46 can operate.

Figure 11:
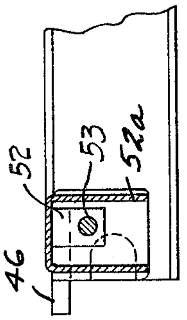
FIGURE 11 is a fragmentary view taken about on the line 11—11 of FIGURE 9 looking in the direction of the arrows.
Figure 10:
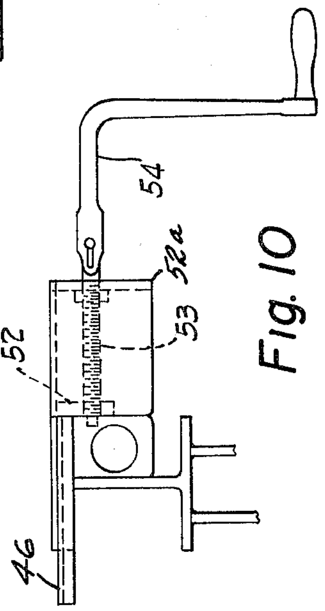
FIGURE 10 is a fragmentaray end view taken about on the line 10—10 of FIGURE 5 looking in the direction of the arrows showing the means of FIGURE 9 in elevation.

The member 46 includes a downwardly depending extension 52 illustrated in FIGURE 10 in dotted lines, coacting with a screw member 53, the latter in turn operable by a handle 54 to move the wedge member 46 back and forth across the end 49 of the flange 22*a*. The handle 59 and screw member 53 are supported by box structure 52*a* as seen in FIGURES 9, 10 and 11.

The adjacent end of the flange 22 of the forward frame part 15 is formed so as to mate with the angular surface 55 of the wedge member 46, and thus when the screw member 53 is manipulated by the handle 54 so as to move the wedge downwardly as viewed in FIGURE 9, when it operates against the mating surface of the forward frame part 15, suitable compression action is provided as between the ends of the respective members, whereby the parts 15 and 15*a* act as the compression means and the truss members 13 and 14 act as the tension means, the members 13 and 14 being suitably fastened to the respective longitudinal frame parts 15 and 15*a* in a manner now to be described in greater detail.

Figure 7:
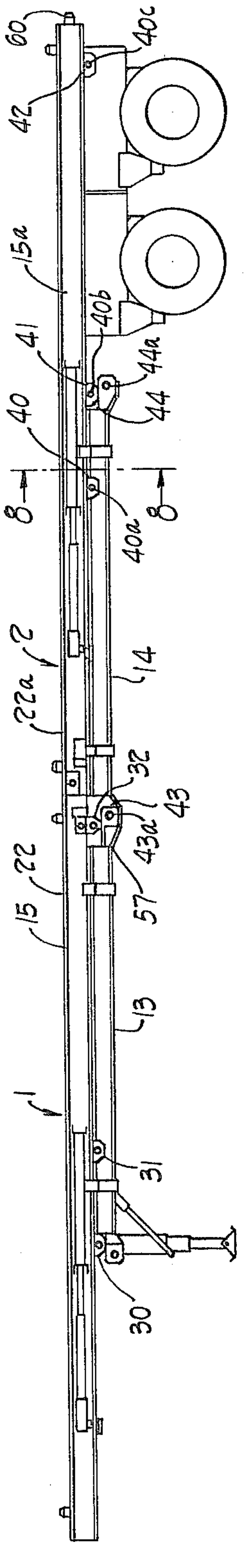
FIGURE 7 is a side view of a pair of chassis units connected together in fore and aft relationship with the bogies adjacent one another and the truss members in operating position.
Figure 15:
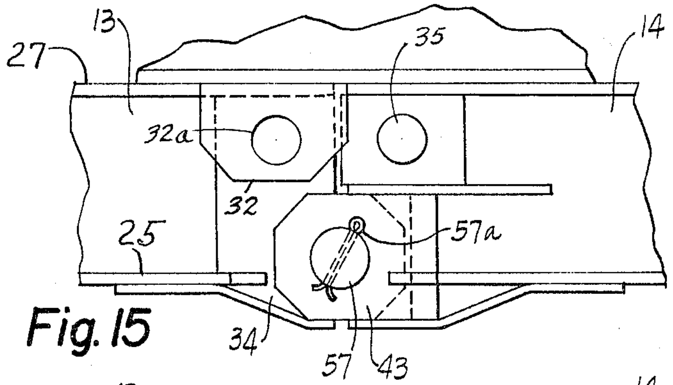
FIGURE 15 is an enlarged fragmentary side view showing the rear connection of the truss members with each other and certain connection with the adjacent frame unit.

Referring to FIGURE 7, it will be seen that the lugs 30 are suitably fastened to the forward frame part 15 by pins 56 like pins 57 in FIGURE 15, similar pins 56 connecting rearward truss member 14 to rear frame part 15*a* by lugs 41 depending therefrom.

Lugs 31 are used as rearmost connections of truss members 13 when the frame of which they are a part becomes a rear frame of a combined unit.

Similarly lugs 40 become forward connection of truss members 14 when the frames of which they are parts becomes a forward frame of a combined unit.

Figure 16:
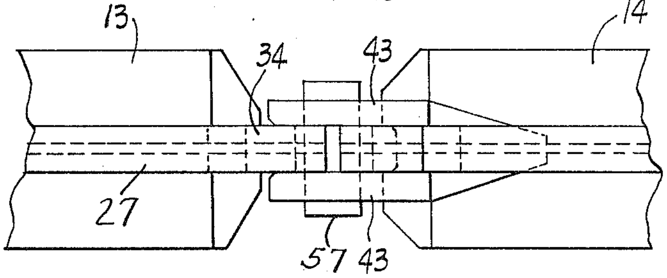
FIGURE 16 is a plan view showing the connection of a pair of truss members.
Figure 17:
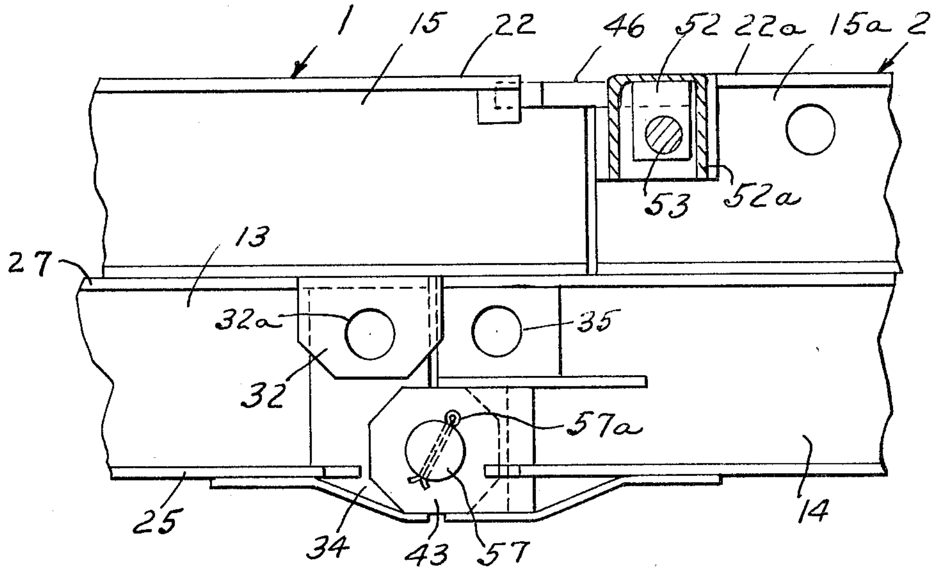
FIGURE 17 is a fragmentary view in side elevation, showing the relationship between truss ends and main frame members.

The adjacent ends of the truss members 13 and 14 are fastened as shown in FIGURES 15 and 16, by means of pins such as 57, the truss members 13 and 14 thereby becoming in effect a single member and acting as a tension member.

The truss members are of course as previously explained fastened by the pin members to the corresponding frame parts 15 and 15*a*, the truss member 14 having been rolled forwardly along the lower flange of the frame part 15*a* for example.

It will be noted that the truss members 13 and 14 are connected at a position spaced from the adjoining ends of the frame parts 15 and 15*a*, this being effected without necessity for moving the truss member 13 from its stored position so to speak.

Suitable adjustment of the wedge member 46 by the handle 54 may be effected so as to maintain the proper horizontal relationship of the respective frame units 1 and 2, it always being remembered that the truss members and frame parts are duplicated or provided in pairs at opposite sides of the respective frame units.

Suitable retaining pins as cotter pins or the like may be used in the ends of the respective pins such as 56 and 57 and designated as 56*a* and 57*a* for example.

The ends of the members 15 and 15*a*, are provided with suitable pin and socket aligning means, the pins being designated 60 and the sockets 61 for aligning of these respective parts and the frame units in general to permit the sliding action of the bogies as required when coupling and uncoupling the chassis units themselves.

FIGURE 6 illustrates a suitable hold down arrangement for maintaining containers such as 3 and 4 in position on the respective chassis units, this being in the form of a downwardly depending J-shaped member 62 extending downwardly from the container and a suitable clamp part 63 being maintained by bolt and nut means 64 in place, an adequate number of these hold down means being provided as necessary.

A sequence of operation of the various parts is set forth by pointing out that the chassis units are aligned as in FIGURE 2, the truss member 14 for example moved forwardly to connected position as illustrated in FIGURES 2, 7 and 15 with ears 34 connected with ears 43 by pins 57, the pins for the respective openings being applied as necessary, the compression adjustment being effected by the handle 54 and thereafter the bogie 5 is moved rearwardly by pulling forwardly on the connected units to the position shown in FIGURE 3. At this time the pair of chassis have been integrally united so as to in effect provide a single chassis, for over the road movement of the vehicle as illustrated in FIGURE 3, the landing gear 7 having been first raised out of position as shown in FIGURE 3 to permit the usual vehicular movement.

The bogies 5 and 6 are slidable either forwardly or rearwardly as the case may be as shown and described in Bohlen et al. Patent 3,004,772 by way of example, so that the uncoupling operation can be effected and either one of the chassis units 1 or 2 can be the forward or aft unit as may be necessary, these being interchangeable as will be understood.

We claim:

1. In chassis frame construction of the class described, in combination, first and second frame units movable into adjacent aligned position for load bearing support, a truss member for each unit and movably engaged therewith, means to connect said members to the units and to each other to form tension means, compression adjustment means intermediate the ends of the units, and bogie means to support said units jointly and independently.

2. The combination as claimed in claim 1, wherein the truss members are slidable beneath the frame units.

3. The combination as claimed in claim 1, wherein the frame units include frame parts comprising compression members, the truss members are slidable beneath said parts, said truss members having means for connection to said frame parts and to each other.

4. The combination as claimed in claim 3, wherein the truss members include means for end to end connection, other means adjacent thereto for connection of at least one of said members to a frame part thereabove, the ends of frame parts of adjacent frame units being closely adjacent each other, and the connection of the truss members being longitudinally spaced from said ends.

5. The combination as claimed in claim 4, wherein the compression adjustment means comprises a wedge member coacting with the end of the adjacent frame part and means for operating said member.

6. In chassis frame construction of the class described, in combination, separable forward and aft frame units, instrumentalities to connect said units in load bearing relation comprising compression and tension means, the compression means including longitudinal frame parts arranged with ends adjacent each other, means intermediate the ends to vary the spacing therebetween, the tension means comprising truss members for each frame unit, said truss members being supported on the frame parts, means to connect certain of the truss members to each other and to the frame parts, and bogie means releasably connected to the aft frame unit, one of said bogie means being movable to a position to support the forward frame unit when the units are separated.

7. The combination as claimed in claim 6, wherein each frame unit includes a pair of longitudinal frame parts, each frame part supports a truss member, the truss members on at least one pair of parts being slidable therealong, and the truss members are connected at adjacent ends, said connection being spaced longitudinally from the juncture of the frame parts.

8. The combination as claimed in claim 6, wherein the means to vary the spacing between the frame parts comprise wedge members and means to move the wedge members transversely, tending to separate the ends of the parts aforesaid.

9. The combination as claimed in claim 7, wherein each of the truss members is slidable along a frame part associated therewith and the corresponding frame part of the adjacent frame unit, and each of said bogie means is movable to a position to support a frame unit, said frame units being thereby interchangeable.

10. The combination as claimed in claim 8, wherein the frame parts comprise I-beam members, the wedge members are interposed between the ends of the upper flanges of the I-beam members, whereby to place said flanges in compression with respect to each other, and screw means are connected to the wedge members to effect movement thereof to and from compression position.

References Cited by the Examiner

UNITED STATES PATENTS

| | | | |
|---|---|---|---|
| 2,747,890 | 5/1956 | Gerhardt et al. | 280—406 |
| 3,061,332 | 10/1962 | Goulden | 280—415 |
| 3,105,703 | 10/1963 | Rittenhouse | 280—415 |
| 3,163,306 | 12/1964 | Bennett et al. | 214—515 |

LEO FRIAGLIA, *Primary Examiner.*